United States Patent [19]
Ishii

[11] Patent Number: 5,857,687
[45] Date of Patent: Jan. 12, 1999

[54] BUMP STOP SEAT STRUCTURE

[75] Inventor: Yoshitake Ishii, Hamamatsu, Japan

[73] Assignee: Suzuki Motor Corporation, Japan

[21] Appl. No.: 815,050

[22] Filed: Mar. 11, 1997

[30] Foreign Application Priority Data

Sep. 26, 1996 [JP] Japan .................................. 8-254094

[51] Int. Cl.$^6$ .................................................. B60G 11/22
[52] U.S. Cl. ................................... 280/124.177; 267/140
[58] Field of Search .................................. 280/716, 689, 280/690, 671, 124.177; 267/139, 140

[56] References Cited

U.S. PATENT DOCUMENTS

| | | | |
|---|---|---|---|
| 2,517,611 | 8/1950 | Utz ............................................ | 280/689 |
| 3,120,952 | 2/1964 | Hendrickson ............................ | 280/716 |
| 3,437,347 | 4/1969 | Hickman .................................. | 280/716 |
| 3,511,332 | 5/1970 | Hickman .................................. | 280/716 |

FOREIGN PATENT DOCUMENTS 61-67610   4/1986   Japan ..................................... 280/689

*Primary Examiner*—Paul N. Dickson
*Attorney, Agent, or Firm*—Finnegan, Henderson, Farabow, Garrett & Dunner, L.L.P.

[57] ABSTRACT

A bump stop seat structure which can achieve a larger cabin space in the room of a vehicle or automobile without sacrificing a bump stroke by suppressing roll angle. In the bump stop seat structure, a stop seat (12) is provided on a housing (6) of an axle (2) of the vehicle in such a manner as to face a bump stop (9) mounted on a body (1) thereof. Further, a flat end face (13), which is nearly level and faces upwardly, is provided on one of opposite side portions of the stop seat (12), which are arranged in the direction of width of the vehicle. Moreover, a convex part (14) projecting to the bump stop (9) is provided only on a part of the other side portion of the stop seat (12). Thus, the convex part (14) is in contact with the bump stop (9) only when the vehicle performs a rolling movement.

4 Claims, 4 Drawing Sheets

BUMP STOP SEAT STRUCTURE

BACKGROUND OF THE INVENTION

1. Field of The Invention

The present invention relates to a bump stop (or stopper) seat structure of a suspension of a vehicle.

2. Description of The Related Art

FIG. 4 is a perspective view of an ordinary conventional axle suspension. FIGS. 5 and 6 are front views of primary parts of a bump stop seat structure of a conventional suspension for illustrating an operation thereof. The conventional axle suspension is provided with left and right coil springs 4, 4 and shock absorbers 5, 5, which are interposed between the bottom portion of an automobile body 1 (see FIG. 5) and an axle 2 and thus connect the body 1 to wheels 3 through the axle 2 to thereby suspend the wheels 3 and so on. The wheels 3 are attached to both ends of the axle 2, respectively, and further, a stop (or stopper) seat 7 is provided on each end portion of an axle housing 6 of the axle 2 (see FIGS. 4 and 5).

This stop seat 7 has a top end face 7a, which is normally level and flat and faces upwardly, as shown in FIG. 7. When the coil spring 4 is compressed as a result of what is called a stroke rolling movement or motion (namely, a stroke of a rolling movement) of the axle 2 and the wheels 3 acting as one body, which is caused by centrifugal force undergone by the automobile during cornering, the flat end face 7a comes in contact with a bump stop 9 mounted on the bottom portion of the automobile body 1. Consequently, a tire 8 is prevented from bumping the automobile body 1.

Further, when one of the side portions of the vehicle (or automobile) has traveled the maximum (or upper) limit of what is called a bump stroke (namely, the moving range of the suspension) and thus the bump stop seat 7 is in contact with the bump stop 9 and moreover, this side portion of the vehicle does not continue this stroke (or movement), the other side portion of the vehicle is brought into what is called a full roll state in which the coil spring of this side portion thereof is stretched to full length.

However, in the conventional bump stop seat structure, when the position $C_1$ of the roll center (in the case of FIG. 5) is lowered to the position $C_2$ thereof by a distance H, as illustrated in FIG. 6, in order to reduce a change due to scuffs formed on the coil spring, the following change occurs. Namely, the rolling movement causes the tire 8 to go inwardly in the direction of width of the vehicle (namely, in the transverse direction thereof). However, the displacement $L_2$ in the transverse direction of the tire 8 in the case of FIG. 6 is larger than that $L_1$ in the transverse direction thereof in the case of FIG. 5. Thus, the conventional bump stop seat structure has a problem in that the clearance or gap $S_2$ between the side surface 1a of the room (or cabin), which is on the side of the body 1, of the vehicle and the inner side surface 8a of the tire 8 in the case of FIG. 6 is smaller than the gap $S_1$ therebetween in the case of FIG. 5 and that the interior width should be reduced by the decreased amount of the gap.

The present invention is accomplished to solve the foregoing problem of the conventional bump seat structure.

OBJECT AND SUMMARY OF THE INVENTION

Accordingly, an object of the present invention is to provide a bump stop seat structure which can achieve a larger cabin space of a vehicle (or automobile) without sacrificing the bump stroke by restricting roll angle.

To achieve the foregoing object, in accordance with the present invention, there is provided a bump stop seat structure which has: a bump stop mounted on one of a body and an axle of a vehicle; and a stop seat provided on the other of the body and the axle of the vehicle. In this bump stop seat structure, a flat end face, which is nearly level, is provided on one of opposite side portions of the stop seat, which are arranged in the direction of width of the vehicle. Further, a convex part projecting to the bump stop is provided only on a part of the other of the opposite side portions of the stop seat. Thereby, the convex part is in contact with the bump stop only when the vehicle performs a rolling movement.

Namely, in the case of the bump stop seat structure of the present invention, the flat end face, which is nearly level, is provided on one of the opposite side (half) portions of the stop seat, which side portions are arranged in the direction of width of the vehicle. Further, the convex part projecting to the bump stop is provided only on a part of the other of the opposite side (half) portions of the stop seat. Moreover, the convex part is in contact with the bump stop only when the vehicle performs a rolling movement. Thus, this bump stop seat structure of the present invention can be obtained only by changing the shape of the stop seat, without requiring additional separate components. Consequently, the bump stop seat structure of the present invention has advantages in that a larger cabin space can be provided a vehicle or automobile without sacrificing a bump stroke by suppressing roll angle but maintaining the riding comfort and the running performance of the vehicle.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Figure 1:
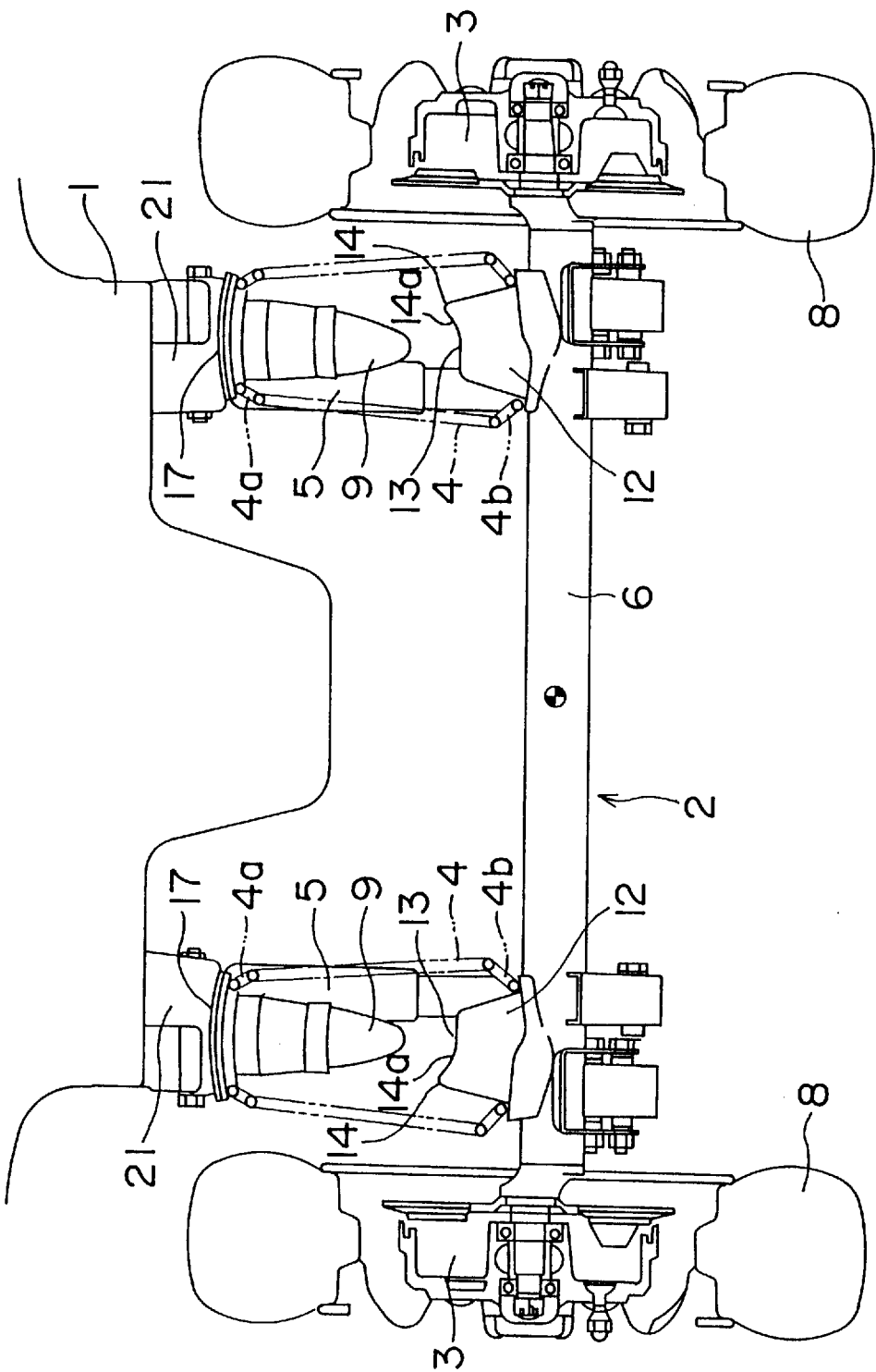
FIG. 1 is a partially cutaway schematic front view of a primary part of an axle suspension having a bump stop seat structure embodying the present invention.
Figure 2:
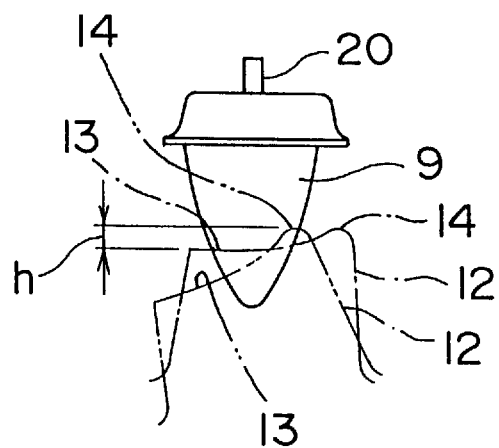
FIG. 2 is a partially enlarged front view of the bump stop seat structure of FIG. 1 for illustrating an operation thereof.

Hereinafter, a bump stop seat structure of an axle suspension of an automobile, which is an embodiment of the present invention, will be described in detail by way of example with reference to the accompanying drawings. FIG. 1 is a partially cutaway schematic front view of a primary part of an axle suspension having a bump stop seat structure embodying the present invention. FIG. 2 is a partially enlarged front view of the bump stop seat structure of FIG. 1 for illustrating an operation thereof.

The bump stop seat structure of this embodiment is provided with coil springs 4 and shock absorbers 5, which are disposed between a body 1 and an axle 2 of the automobile and connect the body 1 to the wheels 3 through the axle 2 to thereby suspend the wheels 3. A stop seat 12 facing upwardly is provided on the axle 2 in such a manner as to face a bump stop 9 mounted on the body 1. This stop seat 12 is provided with a flat end face 13, which is nearly level and faces upwardly and is formed in an inner one of side portions thereof arranged in the direction of width of the vehicle, and with a convex part 14 that projects toward the bump stop 9 and is provided only on a part of the other outer side portion thereof. This convex part 14 is in contact with the bump stop 9 only when the vehicle performs a rolling movement.

Further, a ring-like spring seat 17 is attached to the top end portion 4a of each of the coil springs 4. Moreover, the aforementioned bump stop 9 is inserted into each of the coil springs 4 from the top end portion 4a thereof. The bottom end portion 4b of each of the coil springs 4 is brought into abutting engagement with a housing 6 of the axle 2 during the stop seat 12 is inserted the coil spring 4.

Figure 3:
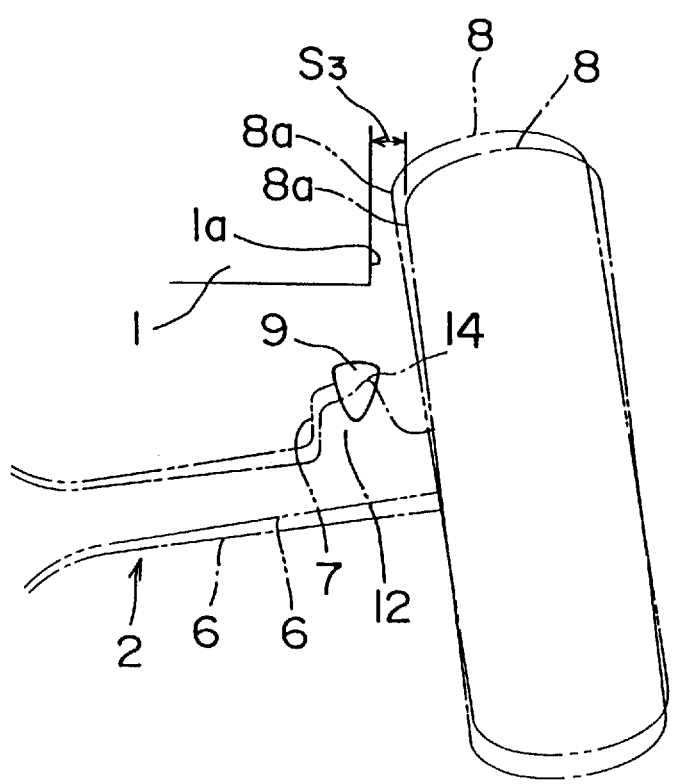
FIG. 3 is a schematic front view of the bump stop seat structure of FIG. 1 for illustrating an operation thereof.
Figure 4:
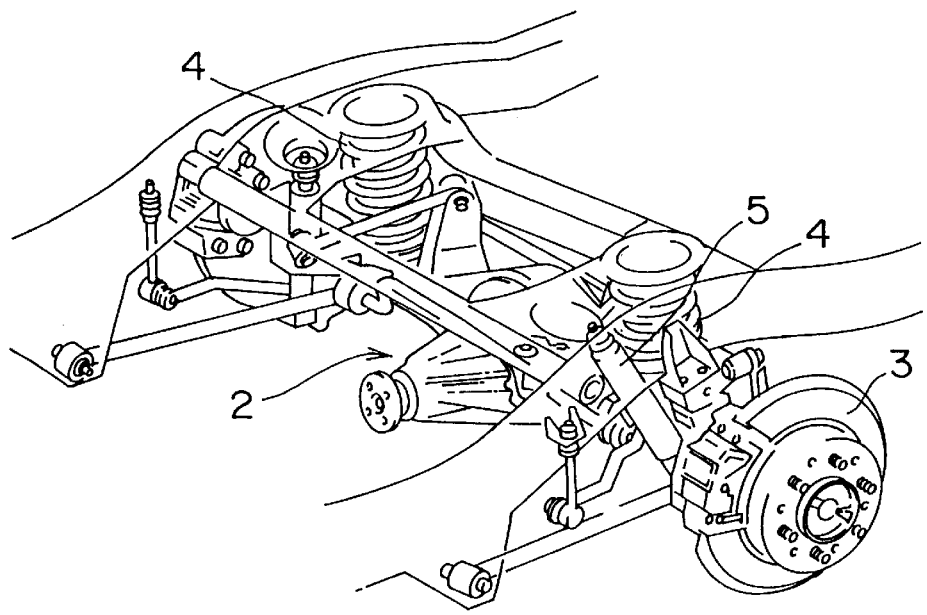
FIG. 4 is a perspective diagram for conceptually illustrating an ordinary conventional axle suspension.

Each of the bump stops 9 is provided with an elastic body portion, which is as a main body thereof, and a stud bolt 20 (see FIG. 2) screwed into the central section of the top part of the elastic body portion. Further, the bump stops 9 are attached to the left and right sides of the bottom portion of the body 1 of the vehicle through backing members 21 fixedly mounted thereon, correspondingly to the left and right wheels 3, respectively, in such a way as to face downwardly. When the body 1 and the axle 2 come close to each other, each of the stop seats 12 abuts against the corresponding one of the bump stops 9, as illustrated in FIG. 3. Thereby, the approach distance of the body 1 from the axle 2 is controlled or limited. Moreover, when the vehicle performs a rolling movement, the tire 8 is prevented from bumping against the outside face of the body 1.

Figure 5:
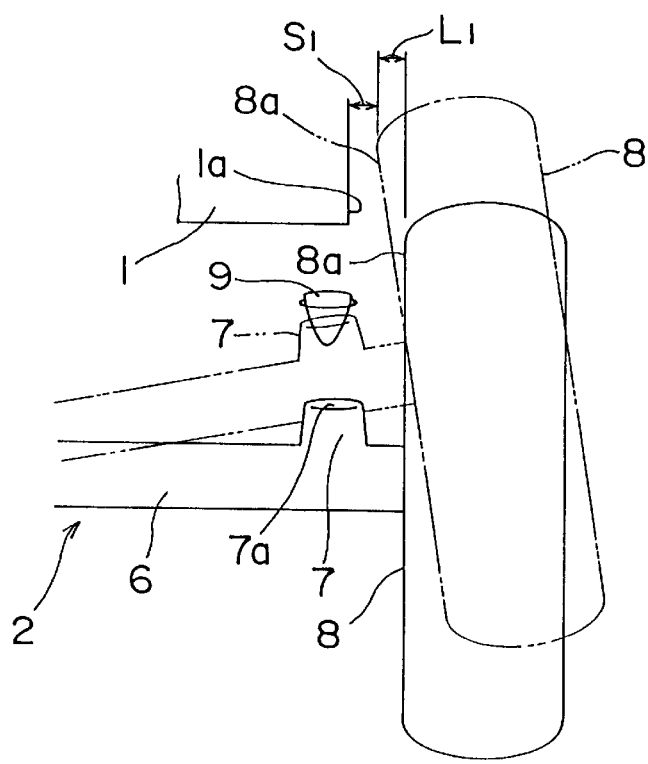
FIG. 5 is a front view of a primary part of a bump stop seat structure of a conventional suspension.
Figure 6:
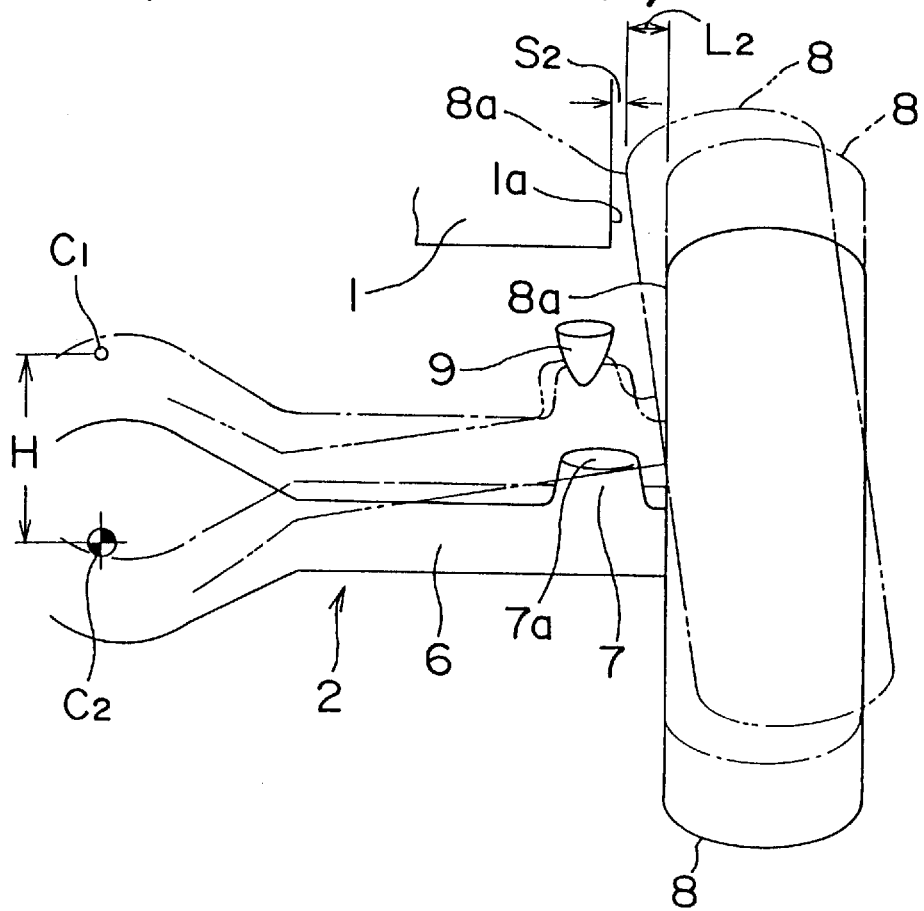
FIG. 6 is a front view of a primary part of a bump stop seat structure of a conventional suspension.
Figure 7:
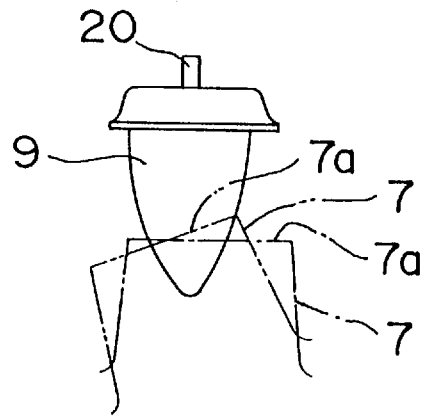
FIG. 7 is a partially enlarged front view of the bump stop seat structure of FIG. 6.

The stop seats 12 are provided at the left and right positions, which are symmetrical with respect to the center of the axle 2, on the housing 6 of the axle 2 in such a manner as to upwardly protrude from the surface of the housing 6. Each of these stop seats 12 is provided with the flat end face 13, which is nearly level and faces upwardly and is formed in an inner one of side portions thereof arranged in the direction of width of the vehicle, and the convex part 14 that has an inclined surface 14a, which faces inwardly and upwardly, and is provided only on a part of the other outer side portion thereof in such a manner as to project upwardly. Normally, the flat end face 13 is placed in such a way as to face the bottom end of the bump stop 9. The flat end face 13 is placed so that the height thereof from the top surface of the housing 6 is equal to the height of each of the conventional flat end faces 7a illustrated in FIGS. 5 to 7.

The manner of the abutting engagement between the bump stop 9 and the stop seat 12 in the case, in which the automobile (or vehicle) is in what is called a full bump state, is different from the manner of the abutting engagement therebetween in the state when the automobile is in what is called the full roll state. In the former case (namely, when the automobile is in what is called the full bump state), as indicated by one-dot chain line in FIG. 2, the flat end face 13 comes in contact with the bump stop 9, similarly as in the case of using the conventional stop seat 7. Thus, the bump stroke in the case of this embodiment and that in the case of the conventional stop seat do not make much difference. Consequently, the riding comfort and the running performance of the automobile are not deteriorated at all.

Further, in the latter case (namely, when the automobile is in what is called the full roll state), as indicated by one-dot chain line in FIGS. 2 and 3, the convex portion 14 comes in contact with the bump stop 9. Thus, as compared with the case of using the conventional stop seat 7 indicated by two-dot chain line in these figures, the roll stroke is suppressed by a predetermined size corresponding to the amount h of projection and the angle of inclination of the inclined surface. Thereby, the width of the gap $S_3$ between the lateral outside surface 1a of the room and the inner side surface 8a of the tire 8 is increased. Consequently, the width of the room can be increased by the increased amount of this gap.

Although the preferred embodiment of the present invention has been described above, it should be understood that the present invention is not limited thereto and that other modifications will be apparent to those skilled in the art without departing from the spirit of the invention. For example, the bump stop 9 and the stop seat 12 may be provided on the axle 2 and the body 1, respectively. Further, the angle of inclination of the inclined surface 14a and the amount h of projection from the flat end face 13 may be arbitrarily changed or set.

The scope of the present invention, therefore, should be determined solely by the appended claims.

What is claimed is:

1. A bump stop seat structure comprising: a bump stop mounted on either one of a body and a axle of a vehicle; and a stop seat provided on the other of said body and said axle of said vehicle, said bump stop seat structure further comprising:
    a flat end face provided on one of opposite side portions of said stop seat, which side portions are arranged in a direction of width of said vehicle, in a manner so that the flat end face is substantially parallel to the axle; and
    a convex part provided only on a part of the other of said opposite side portions of said stop seat, opposite the flat end face, in a manner as to project to said bump stop, said convex part is in contact with said bump stop only when said vehicle performs a rolling movement.

2. The bump stop seat structure according to claim 1, wherein an inclined face is provided between said flat end face and said convex part.

3. A suspension system in a vehicle with a body and an axle, the suspension system comprising:
    a bump stop mounted on the body of the vehicle or the axle of the vehicle;
    a stop seat provided on the body of the vehicle or the axle of the vehicle to oppose the bump stop, the stop seat comprising:
        a flat end face provided on one of opposite side portions of the stop seat, which side portions are arranged in a direction of width of the vehicle, in a manner so that the flat end face is substantially parallel to the axle; and
        a convex part provided only on a part of the other of the opposite side portions of the stop seat, opposite the flat end face, in a manner as to project to the bump stop,
    the flat end face is in contact with the bump stop only when the vehicle is in a full bump state.

4. A suspension system in a vehicle with a body and an axle in accordance with claim 3 wherein an inclined face is provided between the flat end face and the convex part.

* * * * *

UNITED STATES PATENT AND TRADEMARK OFFICE
CERTIFICATE OF CORRECTION

PATENT NO.: 5,857,687

DATED: January 12, 1999

INVENTOR): Yoshitake Ishii

It is certified that an error appears in the above-identified patent and that said Letters Patent is hereby corrected as shown below:

Claim 1, column 4, line 28, change "a axle" to --an axle--.

Signed and Sealed this

Sixth Day of July, 1999

Attest:

Q. TODD DICKINSON

Attesting Officer

Acting Commissioner of Patents and Trademarks